United States Patent [19]

Hasquenoph et al.

[11] 4,257,567
[45] Mar. 24, 1981

[54] RETRACTABLE GRIPPING-ARM DEVICE FOR TRANSPORTING AND JETTISONING RINGLESS LOADS CARRIED UNDER AIRCRAFT

[75] Inventors: Jean H. Hasquenoph, Lagny; Pierre F. Coutin, Paris, both of France

[73] Assignee: R. Alkan & Cie, France

[21] Appl. No.: 16,657

[22] Filed: Mar. 1, 1979

[30] Foreign Application Priority Data

Mar. 1, 1978 [FR] France .................................. 78 05834

[51] Int. Cl.³ .............................................. B64D 1/02
[52] U.S. Cl. .............................. 244/137 R; 89/1.5 B; 89/1.5 F; 294/106
[58] Field of Search .................... 244/137 R; 294/106; 89/1.5 R, 1.5 B, 1.5 C, 1.5 F, 1.5 G, 1.5 H

[56] References Cited

U.S. PATENT DOCUMENTS 2,816,793   12/1957   Elberty ................................ 294/106

FOREIGN PATENT DOCUMENTS

| 2254002 | 7/1975 | France | 89/1.5 F |
| 402315 | 2/1943 | Italy | 89/1.5 B |
| 5917009 | 4/1959 | Italy | 89/1.5 F |

Primary Examiner—Charles E. Frankfort
Attorney, Agent, or Firm—William A. Drucker

[57] ABSTRACT

This device for transporting and jettisoning ringless loads, notably under aircraft, comprises at least one pair of gripping arms operable about two substantially perpendicular axes. Each gripping arm is associated with a separate universal joint structure, the two structures being assembled by a cross member. A structure is provided for locking the gripping arms in their retracted position.

4 Claims, 4 Drawing Figures

RETRACTABLE GRIPPING-ARM DEVICE FOR TRANSPORTING AND JETTISONING RINGLESS LOADS CARRIED UNDER AIRCRAFT

BACKGROUND OF THE INVENTION

1. Field of the Invention

This invention relates in general to means for transporting and jettisoning loads carried under aircraft, and has specific reference to a device of this character which comprises retractable claws for loads not provided with suspension rings or like means.

2. Description of the Prior Art

When the loads to be carried under aircraft are not provided with special anchoring means, it is customary to provide a device comprising jaws or claws for encompassing or gripping the load to be transported and for subsequently releasing or jettisoning it. Devices of this type are described and illustrated in the French Pat. Nos. 1 417 343 of Oct. 2, 1968 and 77.17010 OF June 3, 1977 filed by the same Applicants.

SUMMARY OF THE INVENTION

The device constituting the subject-matter of the present invention departs from the prior art notably in that each one of the gripping arms is adapted to pivot about two substantially perpendicular axes. One of these axes permits the movement of the arms towards each other in a plane perpendicular to the axis of the load to be clamped, and the other axis enables the gripping arms to come up into the wind after the load has been jettisoned. The device is adaptable for transporting load of different diameters by permitting the sliding movement of the gripping shoes for adjustment purpose along the said arms.

However, these various features are not incompatible with the gripping and also with the automatic locking of the load in the clamped position by simply moving the load to its transport position. The load is released and jettisoned by electrically firing standard pyrotechnical means well known in the art. Manual release means are also provided for depositing the load on the ground when necessary.

Preferably, all the component elements of the device are assembled on a common supporting block in order to provide a compact, extremely sturdy and rigid assembly that can easily be removed when necessary.

It is of course also possible, under certain circumstances and when the number of devices to be manufactured does not justify the fabrication of special stamping and/or micro-melting tools, to construct the device from a plurality of relatively simple sub-assemblies or like elements, consistent with relatively simple machining facilities, these elements being subsequently assembled by using any conventional means on a common support structure.

DESCRIPTION OF THE PREFERRED EMBODIMENT

Figure 1:
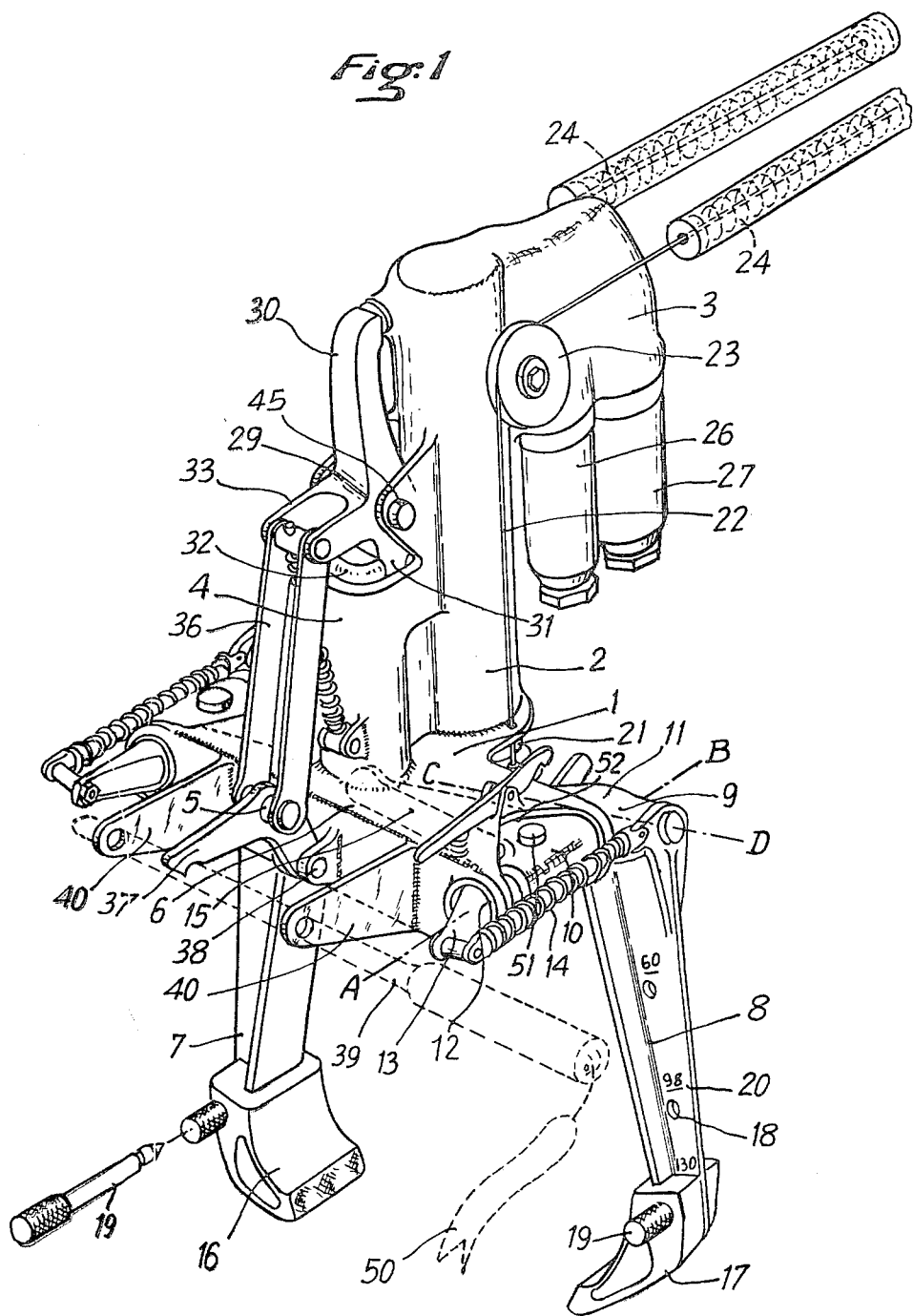
FIG. 1 is a perspective view of the device.

Referring first to FIG. 1, the reference numeral 1 designates the supporting block of the device comprising a load ejection or jettisoning cylinder 2 formed with an upper integral body 3 for fitting the pyrotechnical impellers, an element 4 for automatically suspending the load from the device, a manual release device 5, a cross member 6 supporting the gripping arms 7 and 8, a universal joint 9 for permitting the pivotal movements of the gripping arm 8 about two substantially perpendicular horizontal axes, a similar or homologue universal joint being provided at the opposite end of cross member 6 for supporting the other claw arm 7. The socket member 10 of universal joint 9 is adapted to pivot about the geometrical axis AB parallel to the longitudinal center line of the load, and the axis of the perpendicular socket 11 is oriented as shown by the axis CD which is the axis about which the gripping arm 8 carried by this socket 11 is adapted to pivot. The socket member 10 of the universal joint 9 is journaled in a bore 12 formed in the end portion of the strap-shaped cross member 6. This socket 10 comprises beyond the adjacent end of cross member 6 an extension constituting a support 13 for one end of a bi-stable compression spring 14 of which the other end engages the gripping arm 8. This socket 10 also comprises an upper arm 15 shown in dash lines and engageable by the load (not shown) when the latter is engaged between the gripping arms 7 and 8. A stud 51 is provided for limiting the amplitude of the angular opening movement of the corresponding arm by abuting a notch 52 formed in the cross member 6.

The gripping arm 8 is shown in a operative position stabilized by the spring 14 of which the line of action lies in a plane slightly above the axis CD so that it constantly urges the relevant gripping arm to its closed or load-gripping position. The load is gripped or held in position through the medium of load-engaging shoes 16 and 17, respectively. These shoes 16, 17 are each adapted to slide along the corresponding gripping arms so that the position corresponding to the diameter of the load to be gripped can be selected as necessary. These positions are determined for example on each arm 7, 8 by a plurality of holes such as 18 adapted to receive a lock bolt 19 for interlocking the shoe and the gripping arm in the selected position. To facilitate the preliminary adjustment of these shoes, the holes may be provided with reference numbers as shown at 20 indicating for example the diameter of the load to be carried by the device, or any other reference marks for identifying or defining this load.

The reference numeral 21 designates the lower end of the ejection or jettisoning piston adapted to be retracted within its cylinder 2 by means of a pair of cables, of which only one is shown at 22. A pair of symmetrical grooved pulley 23 connect these cables to longitudinal coil compression springs 24 the characteristics of which are determined as a function of the stroke of the ejection piston and also of the force necessary for returning this piston to its inoperative position.

Figure 2:
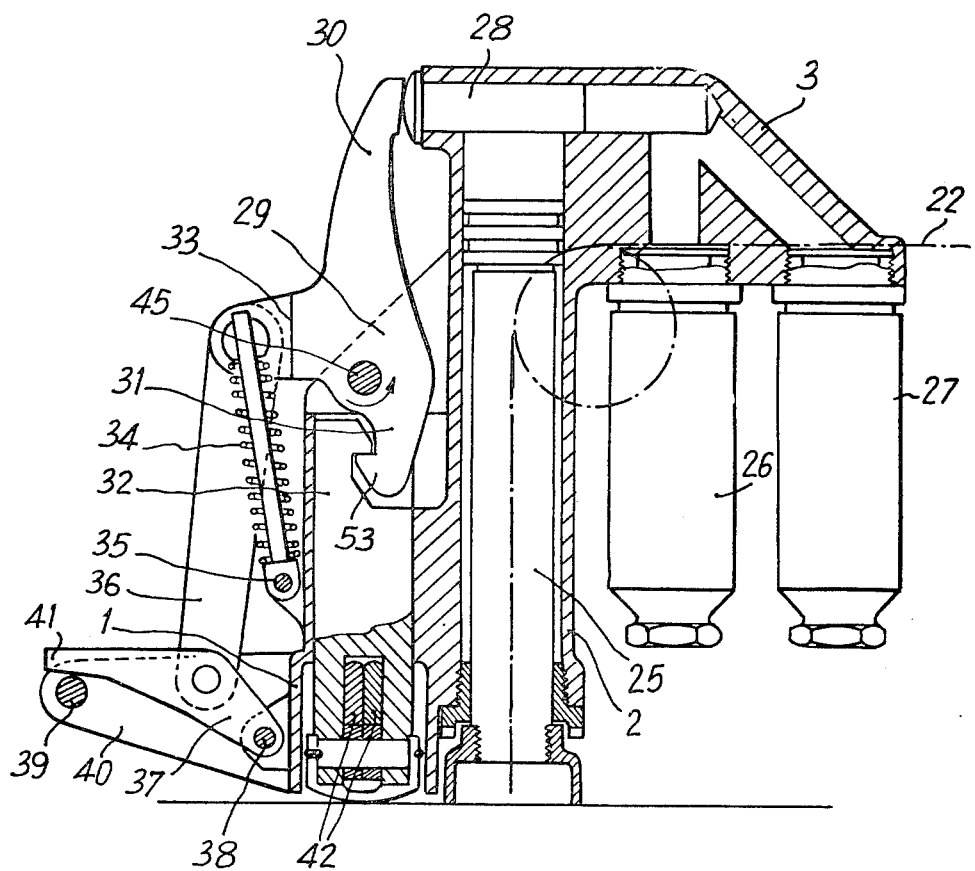
FIG. 2 is a diagrammatic longitudinal section of the device.

In FIG. 2, the same reference numerals designate the same component elements as in the preceding Figure, and the section shows at 25 the ejection piston slidably mounted in the bore of cylinder 2, the gases from impellers 26 and 27 actuating this piston only when the release bolt 28 has been removed to the left, as seen in FIG. 2. The load is locked in position by means of a three-armed lever 29 of which one arm 30 is responsive to the lock bolt 28. Another, hook-shaped arm 31 of this lever is shown in FIG. 2 in the position corresponding to the cocking of the control piston 32. The third arm 33 of lever 29 is urged to its locking and cocking position by a coil compression spring 34 reacting against a fixed pivot pin 35. The same arm 33 is adapted to be moved manually to its release position by compressing the spring 34 with the assistance of a double connecting-rod 36 pivoted at one end to the outer end of arm 33 and at the opposite end to a two-armed control lever 37 fulcrumed on a fixed pivot pin 38. This lever 37 is normally locked in position by a detachable spindle 39 guided in holes formed through fixed lugs or brackets 40 when necessary, this manual release action may be obtained by depressing the end 41 of lever 37 after removing the spindle 39.

Figure 3:
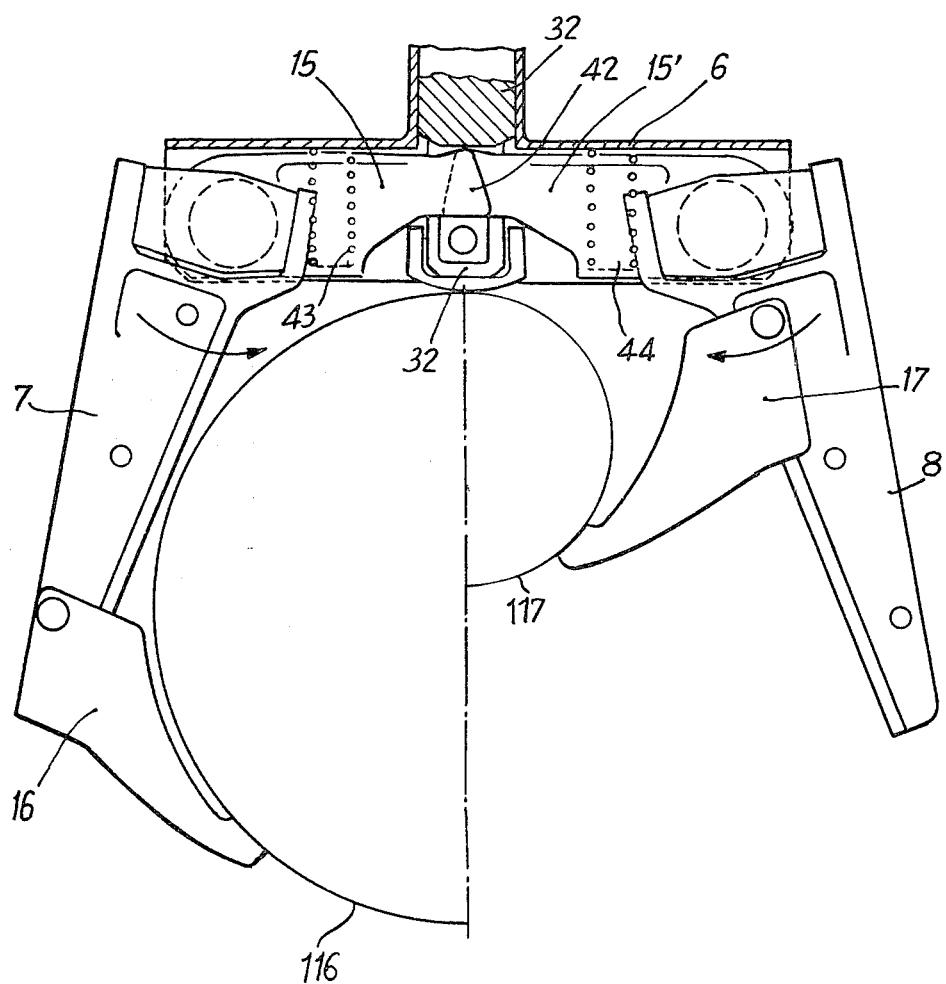
FIG. 3 is a cross section illustrating more particularly the adaptability of the device to loads of different diameters.

FIG. 3 illustrates by way of example two possible end positions of the shoes 16 and 17 corresponding to the maximal and minimal diameters contemplated for the load of which the contour is either 116 or 117, respectively. The upper arms 15 and 15' respectively of the universal joints already described hereinabove are pivoted about the longitudinal axes of these joints, together with the corresponding arms 7 and 8. The ends 42 of these upper arms 15 and 15' are engaged in the control piston 32 under which the load is caused to bear when properly gripped by and in the device.

The compression springs 43 and 44 constantly urge the gripping arms 7 and 8 to their open or release position by reacting on the one hand against the bottom of cross member 6 and on the other hand against the upper arms 15 and 15' rigid with said gripping arms 7 and 8.

Figure 4:
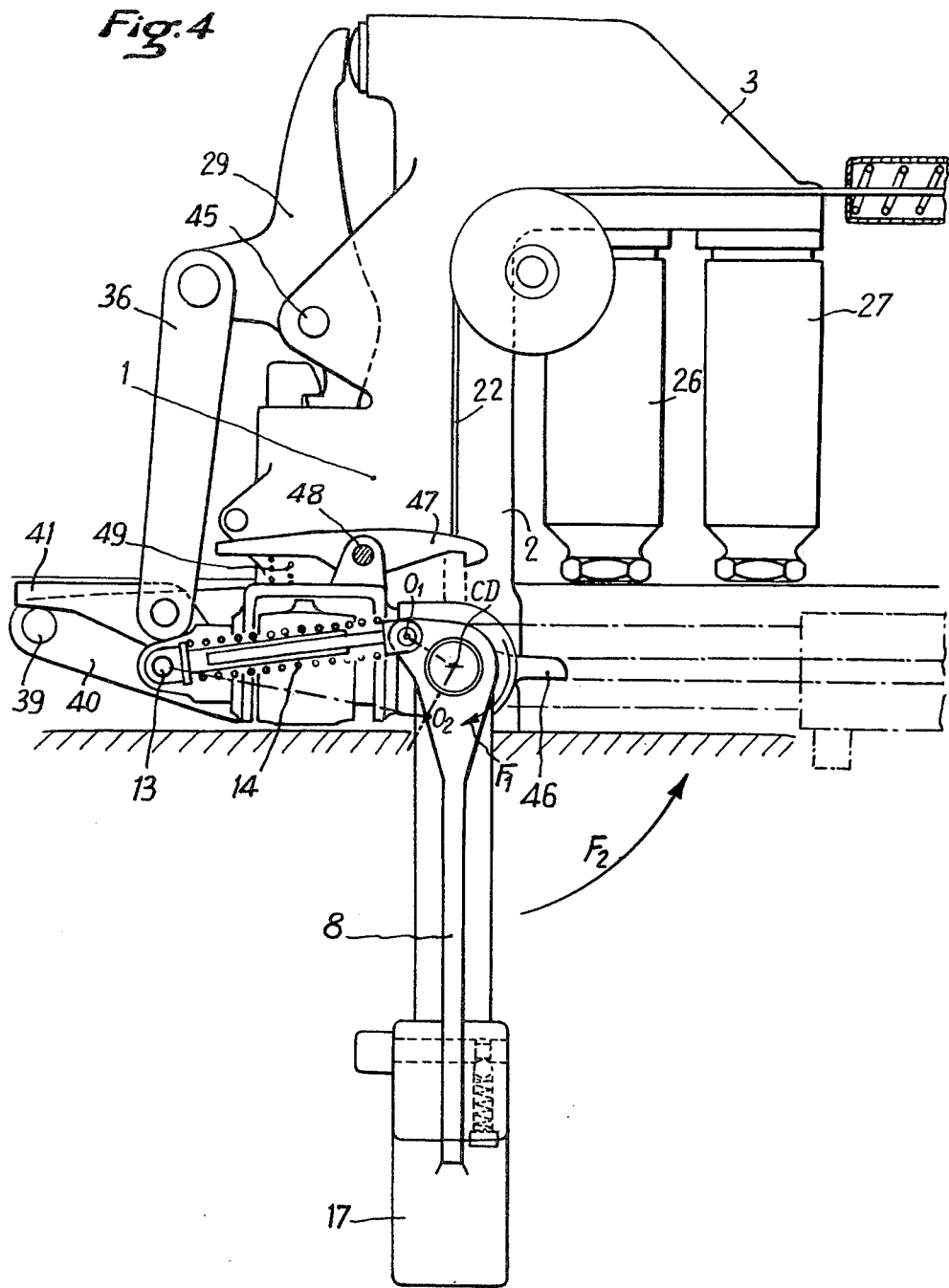
FIG. 4 is a side elevational view of the device.

In FIG. 4, the operative position and the inoperative or retracted position of gripping arm 8 is shown more in detail, the other gripping arm 7 lying in the same transverse plane and being of course concealed by the first arm 8.

In the operative position shown in thick lines the gripping arm 8 is in a plane perpendicular to the load axis and held in this position by the compression spring 14 engaging the arm 8 at a pivot center 01 and urging this arm in the direction of the arrow F2.

The retracted position is obtained initially by the pressure exerted by the relative wind (after the load has been jettisoned) and then by the force of spring 14 when its line of action has moved to a position lower than that of axis CD to the position designated by the reference symbol 02. This retracted position shown in dash-and-dot lines is obtained after an angular movement in the direction of the arrow F2. The gripping arm is held in this position by means of a finger 46 rigid with the corresponding joint socket 11 and engaged by the hook-shaped end of a two-armed lever 47 fulcrumed on a fixed pivot pin 48 and urged to its locking position by a spring 49.

Assuming that both gripping arms 7 and 8 lie in a plane perpendicular to the load axis, the shoes 16 and 17 are fastened to these arms by means of lock bolts 19 engaging the proper holes of the gripping arms, i.e. those consistent with the size of the load contemplated. In case these gripping arms were not in their open position, for example as a consequence of a previous operation of the device, they can be opened manually as explained hereinabove by depressing the end 41 of lever 37 after removing the spindle 39. Also as explained in the foregoing, depressing this lever 37 will cause via the connecting-rod 36 the arm 33 of lock lever 29 to be lowered, thus compressing the spring 34. This lever 29 will thus pivot in the direction of the arrow of FIG. 2 about the fixed pivot pin 45 and the hook-shaped end 53 of arm 31 will release the control piston 32 urged downwardly by springs 43 and 44 through the upper arms 15 and 15'. The movement of these upper arms 15, 15' is attended by the opening of the gripping arms 7, 8 to which they are coupled through the universal joints 9.

The device is thus able to receive the load, the gripping arms 7 and 8 being open and the control piston 32 in its lowermost position. When the load is placed under the gripping arms and then raised therebetween, the control piston 32 is pushed upwards and eventually retained by the hook-shaped end 53 of lever 29, the spring 34 firstly permitting the pivotal movement of this end 53 in the direction of the arrow in FIG. 2, and then its engagement and locking action in the upper end of piston 32.

During its upward movement the piston 32 carries along the ends 42 of the upper arms 15 while compressing both springs 43 and 44. These upper levers 15 rigid with the gripping arms 7 and 8 cause the latter to move irreversibly towards each other as shown by the arrows in FIG. 3, so as to safely hold the load, as shown. The spindle 39 is then inserted again through the holes of lugs 40 to prevent any untimely release during taxiing or other manoeuvers on the ground. At the last moment, before the aircraft takes off, this spindle provided with a regulation identifying pendant 50 is removed.

During the flight, the jettisoning and ejection actions are obtained by firing impellers of which the combustion gases cause firstly the release of the holding elements as a consequence of the actuation of the lever 29 by the lock bolt 28 pushing the arm 30 thereof in the direction of the arrow (FIG. 2), thus releasing the control piston 32 and opening the gripping arms 7 and 8, as already explained. When the transfer of combustion gases to the ejection cylinder 2 is permitted as a consequence of the movement of lock bolt 28 to the left (FIG. 2), the ejection piston 25 forces the load downwards. The thus released gripping arms 7, 8 are then allowed to pivot under the pressure of the relative wind, this movement being assisted during the second section of their stroke by the spring 14. The locking action exerted by the hook-shaped end of lever 47 in this retracted position prevents any detrimental "floating" of the gripping arms. In order to minimize drag during a flight, the ejection piston 25 of the device, after the pressure drop, is restored to its retracted position by the force of springs 24 which is transmitted through the connecting cables 22. It is clear that this retraction could also be obtained by using one of the various known devices operating by partial derivation of the ejection gases.

If it has not been possible to fulfil the mission contemplated and if it is desired to deposit the load on the ground after landing, the lever 37 is operated manually by depressing its end 41, as already explained in the foregoing.

What we claim is:
1. A device, for transporting and jettisoning ringless loads carried under aircraft, said loads, having a longitudinal axis and having an upper face when carried under the aircraft, comprising:
(i) a supporting block including a cylinder and a housing,
(ii) an ejection piston slidable in said cylinder and adapted to engage said upper face of the load,

(iii) at least one pyrotechnical impeller fixed in said housing and adapted to control the sliding of said ejection piston, (iv) means to return said ejection piston to a retracted inoperative position after firing of said pyrotechnical impeller, (v) a pair of universal joints carried by said supporting block, (vi) a pair of pivoted gripping arms, acting as jaws and adapted to clamp the load for the carrying thereof, each universal joint being associated with one of said gripping arms to allow said arms to pivot both in a plane perpendicular to the load axis, to ensure the gripping, carrying and releasing of the load, and also in a direction parallel to the load axis for the retraction of said gripping arms in the airstream, (vii) locking means for maintaining said gripping arms in their gripping position, (viii) means automatically ensuring the release of said locking means under the control of said pyrotechnical impeller, (ix) first spring means automatically ensuring a spacing of the gripping arms in a plane perpendicular to the load axis when said locking means are released, and (x) second spring means associated with each gripping arm to assist pivoting of said gripping arms parallel to the load axis under the force of the airstream when the load has been released.

2. A device, according to claim 1, wherein each gripping arm has slidably mounted on an inner edge thereof a shoe adapted to engage the load, means being provided to lock said shoe in a desired position along the gripping arm according to the diameter of the load to be transported.

3. A device, according to claim 1, wherein said second spring means is a bi-stable spring associated with each gripping arm and with the corresponding universal joint, for stabilizing said gripping arm in its position wherein said arm can pivot to engage the load and in its retracted position.

4. A device, according to claim 1, wherein means are provided for locking said gripping arms in their retracted position to prevent the floating thereof in the airstream.

* * * * *